United States Patent [19]

Mori et al.

[11] Patent Number: 5,630,641
[45] Date of Patent: May 20, 1997

[54] SUNROOF DEVICE FOR VEHICLE

[75] Inventors: Keiji Mori, Kariya; Hironori Ochiai, Chiryu; Akitoshi Sometani, Okazaki, all of Japan

[73] Assignee: Aisin Seiki Kabushiki Kaisha, Japan

[21] Appl. No.: 562,492

[22] Filed: Nov. 30, 1995

Related U.S. Application Data

[63] Continuation of Ser. No. 281,685, Jul. 28, 1994, abandoned.

[30] Foreign Application Priority Data

Jul. 29, 1993 [JP] Japan .................. 5-188343

[51] Int. Cl.⁶ .................................................. B60J 7/19
[52] U.S. Cl. .................................. 296/224; 296/221
[58] Field of Search ........................ 296/216, 221–224

[56] References Cited

U.S. PATENT DOCUMENTS

| | | | |
|---|---|---|---|
| 4,688,848 | 8/1987 | Niwa | 296/216 |
| 4,877,285 | 10/1989 | Huyer | 296/220 X |
| 4,974,902 | 12/1990 | Huyer | 296/223 |
| 5,020,849 | 6/1991 | Schlapp | 296/221 |
| 5,066,068 | 11/1991 | Suzuki et al. | 296/221 |
| 5,184,870 | 2/1993 | Bauhof | 296/223 |
| 5,326,149 | 7/1994 | Schlapp | 296/224 |

FOREIGN PATENT DOCUMENTS

| | | |
|---|---|---|
| 3801881C2 | 8/1988 | Germany . |
| 4001759C1 | 4/1991 | Germany . |
| 64-22621 | 1/1989 | Japan . |
| 1-148916 | 10/1989 | Japan . |
| 2090630 | 7/1982 | United Kingdom ........... 296/222 |

*Primary Examiner*—Dennis H. Pedder
*Attorney, Agent, or Firm*—Finnegan, Henderson, Farabow, Garrett & Dunner, L.L.P.

[57] ABSTRACT

A sunroof device includes a guide rail for a roof panel of a vehicle, a movable panel for opening and closing an opening in the roof panel, the movable panel being mounted on the guide rail through a link mechanism, a driving shoe slidably disposed between the guide rail and the link mechanism, a driven shoe slidably disposed between the guide rail and the movable panel, and a check mechanism for engaging and disengaging the guide rail and the driven shoe including a striker connected with the driving shoe, a check member for engaging and disengaging the guide rail connected with the driven shoe, and a latch member which is engaged by the striker so that the latch member disengages the check member from the guide rail.

8 Claims, 9 Drawing Sheets

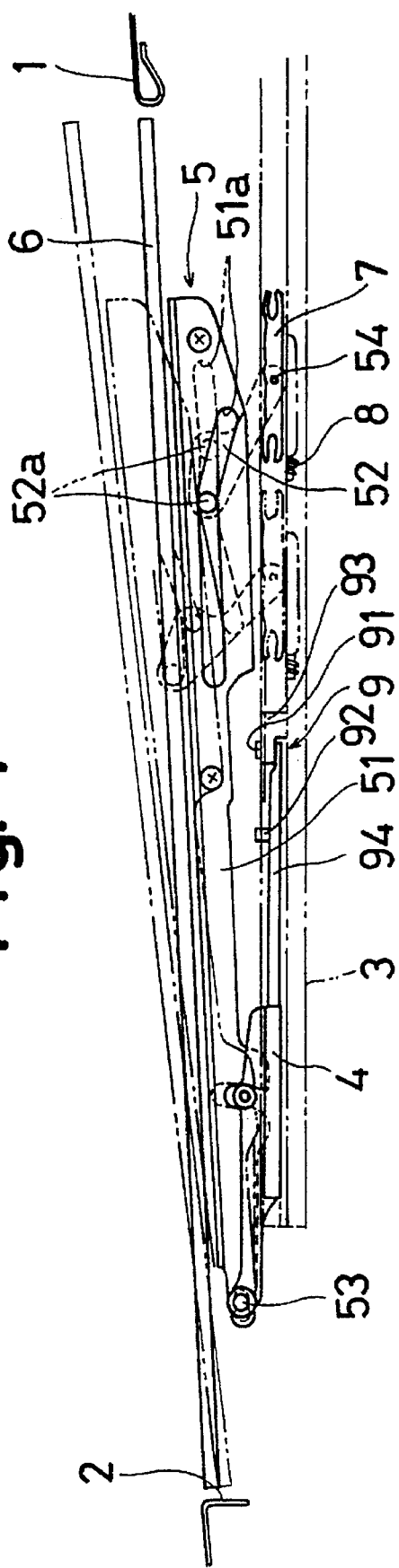
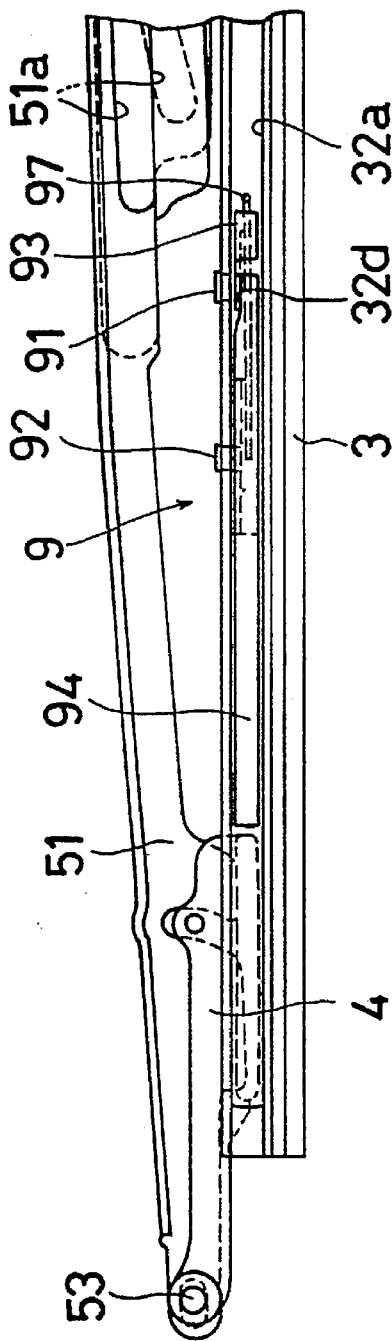

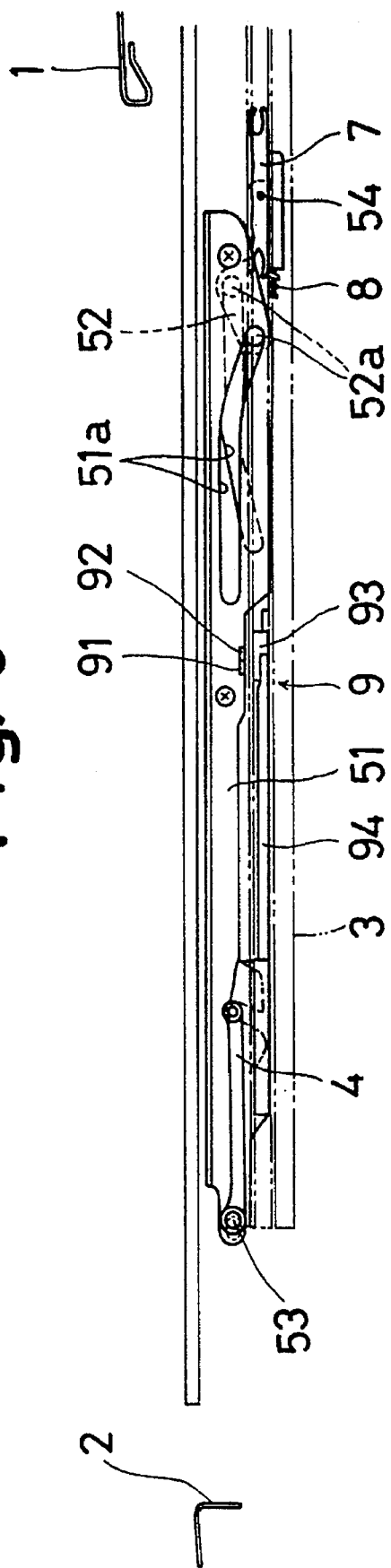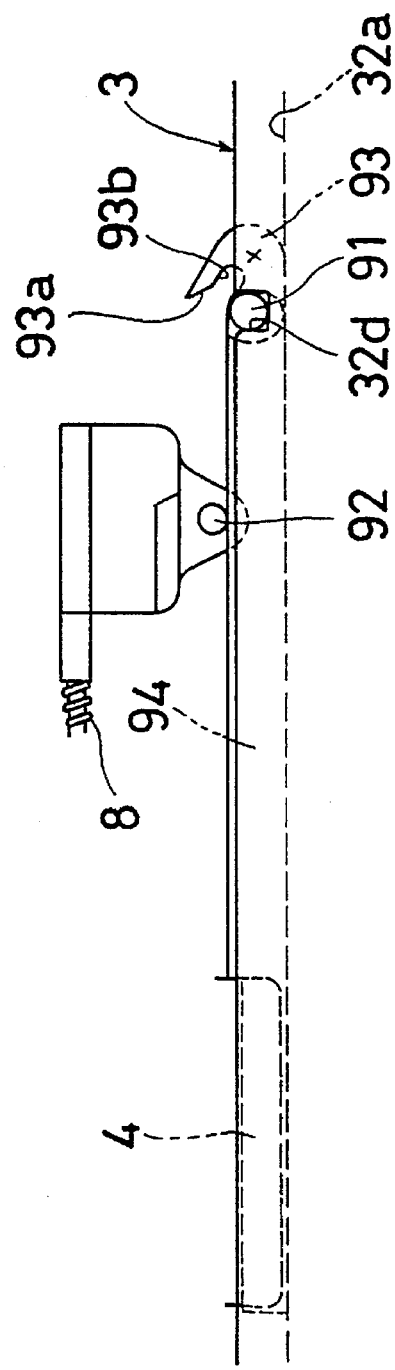

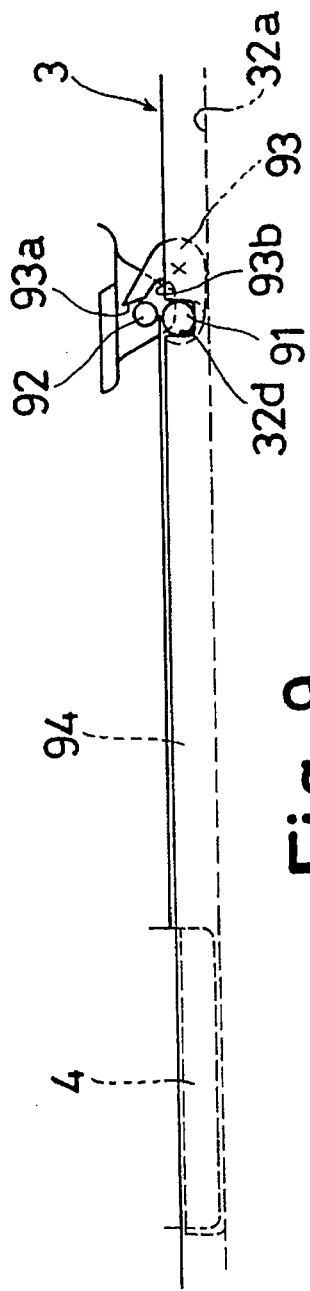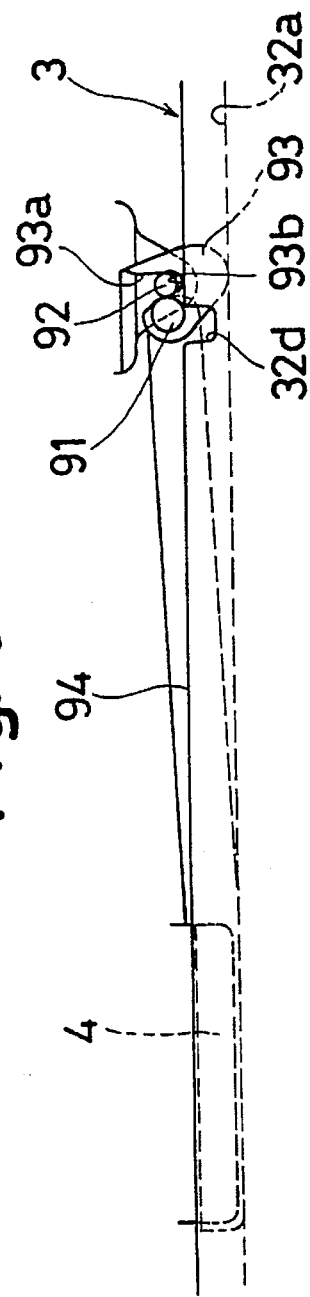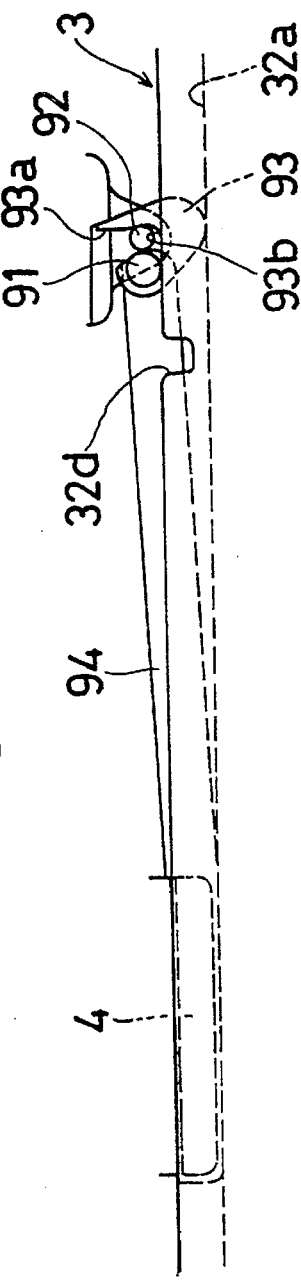

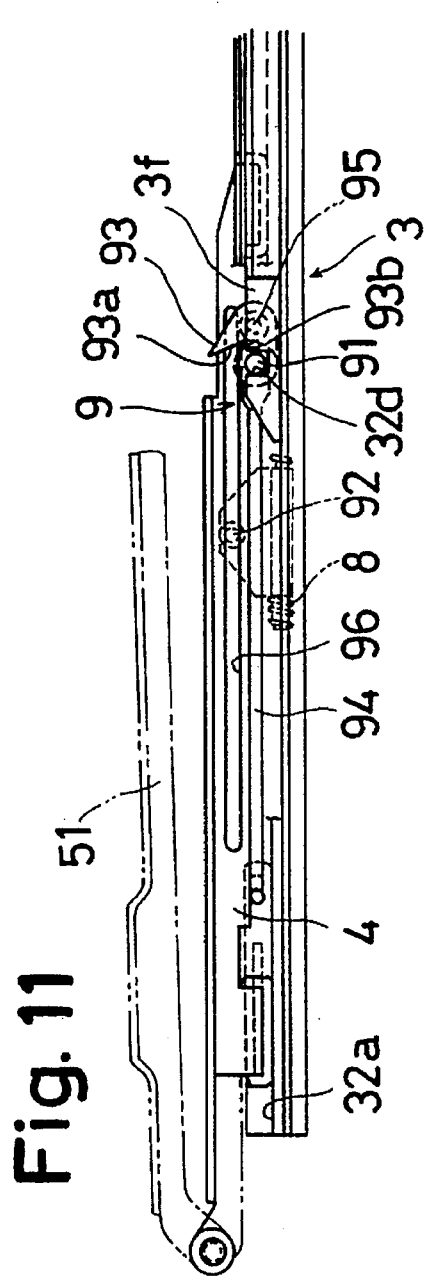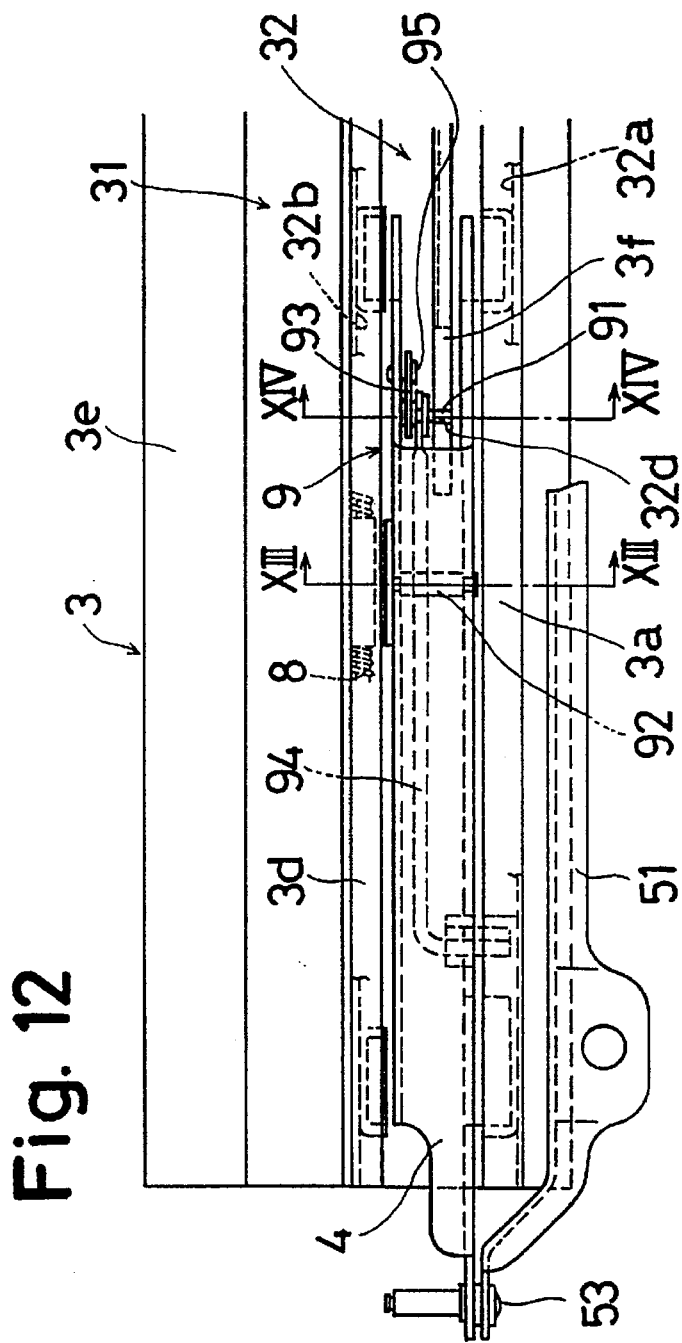

SUNROOF DEVICE FOR VEHICLE

This application is a continuation of application Ser. No. 08/281,685, filed Jul. 28, 1994, now abandoned.

BACKGROUND OF THE INVENTION

1. Field of the Invention

This invention relates to a sunroof device for a vehicle in which a movable panel is at least operated from a slide down operation to a sliding operation and from the sliding operation to a slide up operation so as to open and close an opening mounted on a roof of the vehicle, and in particular relates to a check mechanism which holds a driven shoe so as to prevent the movable panel from being slid when the movable panel is under the slide up operation and a slide down operation.

2. Description of the Related Art

A conventional sunroof device for a vehicle is disclosed in the Japanese Patent Laid Open No. 64 (1989)-22621. The sunroof device for a vehicle disclosed in the prior art comprises a guide rail fixed on a roof panel so as to be located near a circumferential portion of an opening disposed on the roof panel. The sunroof device for a vehicle comprises a driving shoe, a driven shoe and a movable panel pivotably supported on the driven shoe and supported on the driving shoe through a link mechanism in order that the movable panel may open and close the opening through an operation of the link mechanism. The sunroof device for a vehicle further comprises a check mechanism disposed between the driven shoe and the guide rail and which prevents the driven shoe from being slid at a given position. The link mechanism is operated by a slide operation of the driving shoe in order that the movable panel is operated from the slide down operation to the sliding operation and from the sliding operation to the slide up operation so as to open and close the opening.

In accordance with the prior art, the check mechanism includes a check member slidably supported on the guide rail and which is engagable and disengagable with the driven shoe. The check mechanism further includes a lever pivotably supported on the driven shoe and which is engagable and disengagable with the movable panel and the check member. The driven shoe is prevented from being slid at a given position by the engagement of the check member and the driven shoe. The lever and the movable panel are engaged with each other by the slide down operation of the movable panel so as to rotate the lever. Therefore the lever and the check member are engaged so as to disengage the check member from the driven shoe in order that the driven shoe is able to be slid. To the contrary, the lever and the movable panel are disengaged from each other by the slide up operation of the movable panel. Therefore the lever and the check member are disengaged so as to engage the check member with the driven shoe in order that the driven shoe is not able to be slid.

However in accordance with the prior art, since the movable panel is dislocated from the tilt position to be located relative to the corresponding position of the driving shoe, because of manufacturing variations of the scale of the parts in the link mechanism which slides up and slides down the movable panel, the timing of the engagement and the disengagement between the check member and the driven shoe is also dislocated from the timing to be engaged and disengaged relative to the corresponding position of the driving shoe. Therefore, the slide stroke of the driving shoe is varied relative to a predetermined stroke. Consequently, the sunroof device for a vehicle must be enlarged and heavy in weight because of the enlargement of the driving shoe.

SUMMARY OF THE PRESENT INVENTION

It is an object of the present invention to provide a sunroof device for a vehicle including a check mechanism which can strictly engage and disengage a movable panel and a guide rail relative to a position of a driving shoe.

It is another object of the present invention to provide a vehicle sunroof device which is easy to manufacture.

It is a further object of the present invention to provide a vehicle sunroof device which is durable.

It is a further object of the present invention to provide a vehicle sunroof device which has a simplified structure and is small in size.

It is a further object of the present invention to provide a vehicle sunroof device which is low in cost.

To achieve the objects and in accordance with the purpose of the invention, as embodied and broadly described herein, the sunroof device of the present invention comprises a guide rail designed to be fixed to a vehicle roof panel and having a generally rectangular-shaped groove formed therein, a movable panel slidable along the guide rail for opening and closing the opening of the roof panel, a link mechanism connected to said movable panel, a driving shoe slidably mounted in the guide rail and supporting the movable panel by the link mechanism, a driven shoe slidably mounted in the guide rail and supporting the movable panel, an intermediate member extending substantially in parallel with the guide rail and connected to the driven shoe such that the intermediate member moves together with the driven shoe, a check member connected to the intermediate member and retained in the rectangular-shaped groove of the guide rail, a driven striker positioned at one side of the rectangular-shaped groove of the guide rail, a rotatable latch member positioned at the other side of the rectangular-shaped groove of the guide rail and serving as a lever for removing the check member from the rectangular-shaped groove of the guide rail when the striker is brought into engagement with the latch member, said check member being maintained in the rectangular shaped groove of the guide rail until the driven striker is driven into engagement with the latch member.

BRIEF DESCRIPTION OF THE DRAWINGS

The features and advantages of the sunroof device for a vehicle according to the present invention will be more clearly appreciated from the following description in conjunction with the accompanying drawings wherein:

FIG. 1 is a side view of a vehicle sunroof device made in accordance with the present invention;

FIG. 2 is a partly enlarged view of the check mechanism of FIG. 1 of the sunroof device of the present invention;

FIG. 6 is a side view of the sunroof device of the present invention for explaining the operation of the invention;

FIG. 7 is an elevational view of a check mechanism of the sunroof device of the present invention for explaining the operation of the check mechanism of the invention;

FIG. 8 is an elevational view of a check mechanism of the sunroof device of the present invention for explaining the operation of the check mechanism of the invention;

FIG. 9 is an elevational view of a check mechanism of the sunroof device of the present invention for explaining the operation of the check mechanism of the invention;

FIG. 10 is an elevational view of a check mechanism of the sunroof device of the present invention for explaining the operation of the check mechanism of the invention;

FIG. 11 is a side view of a first alternate embodiment of a check mechanism of the sunroof device of the present invention;

FIG. 12 is a plan view of FIG. 11 of the sunroof device of the present invention;

DETAILED DESCRIPTION OF PREFERRED EMBODIMENTS OF THE INVENTION

Figure 3:
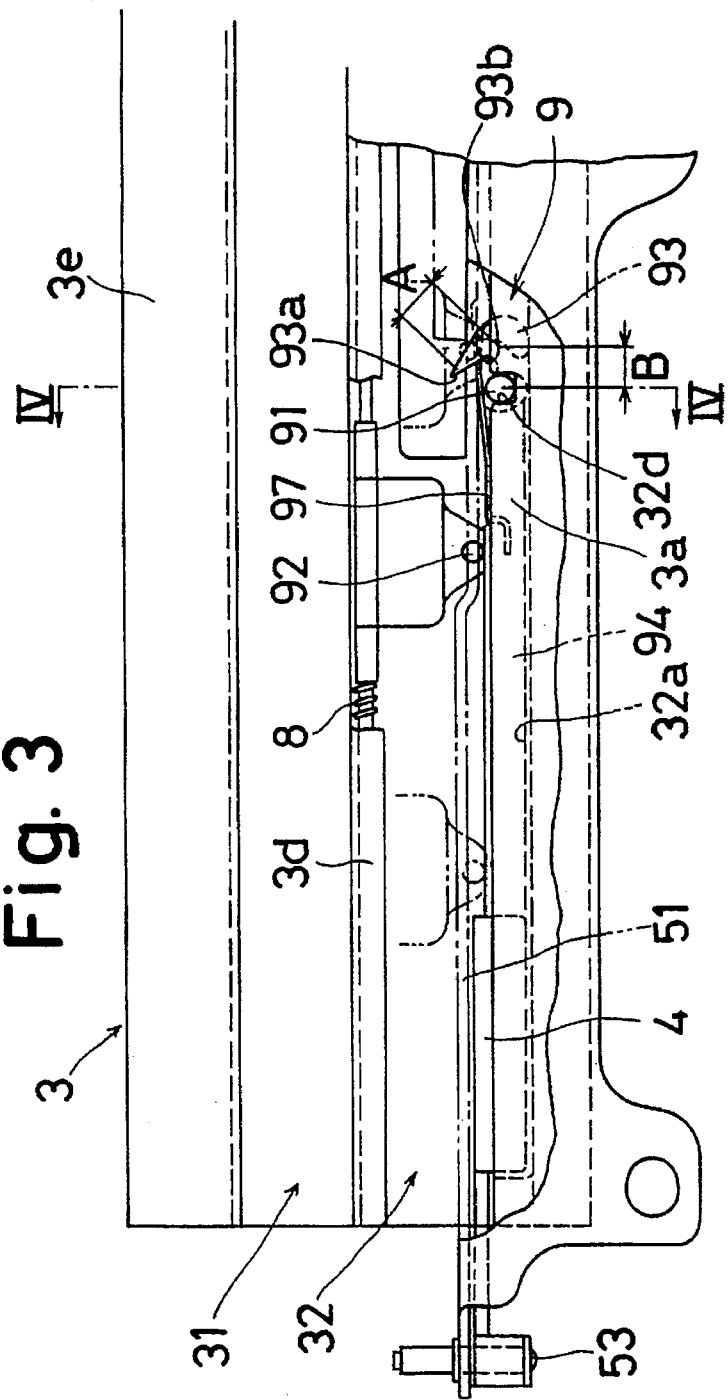
FIG. 3 is a plan view of FIG. 2 of the sunroof device of the present invention.

Referring to FIG. 1, a roof panel 1 includes an opening 2. A pair of guide rails 3 (one of which is shown in FIG. 1) is fixed on the roof panel 1 so as to be located at both sides of the opening 2. The guide rails 3 are connected with a front frame (not shown in the FIGURES) disposed at a front side of the opening 2 so as to form a frame. A movable panel 6 is supported on the guide rails 3 through a conventional link mechanism 5 including a supporting link 51 and a lift link 52 so as to open and close the opening 2 by the operation of the link mechanism 5.

Figure 4:
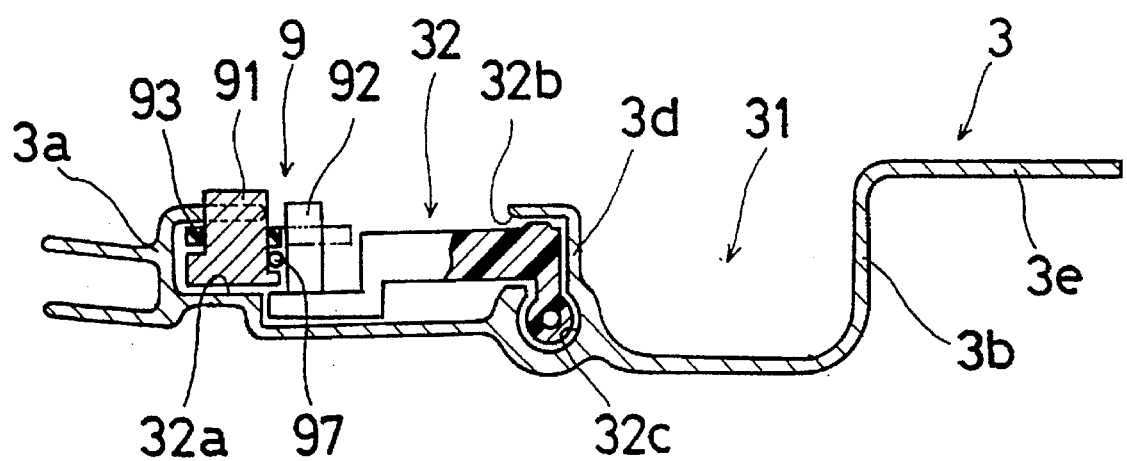
FIG. 4 is a sectional view of the sunroof device of the present invention taken on line IV—IV of FIG. 3.
Figure 13:
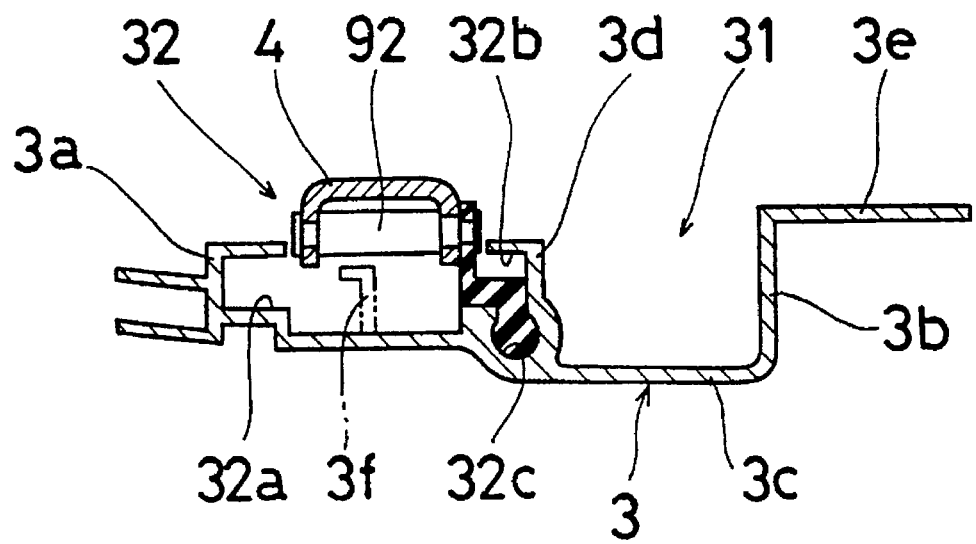
FIG. 13 is a sectional view of the sunroof device of the present invention taken on line XIII—XIII of the FIG. 12.
Figure 14:
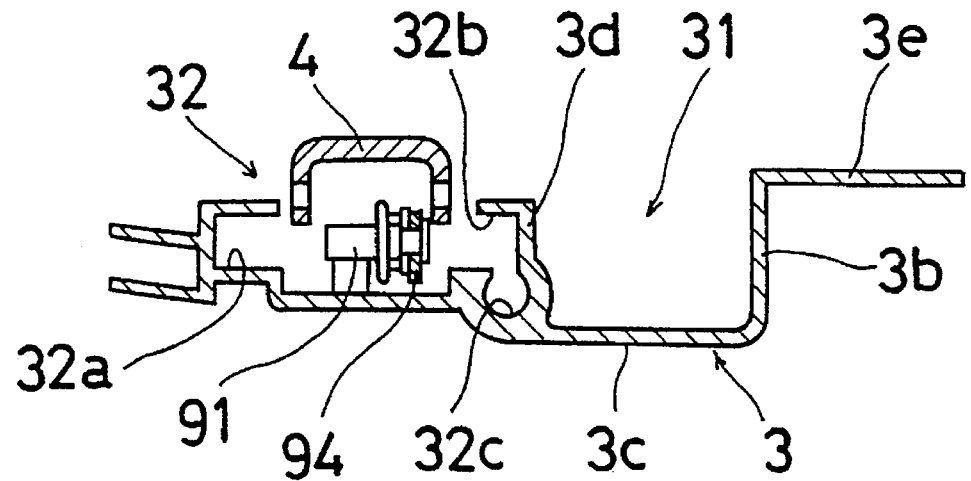
FIG. 14 is a sectional view of the sunroof device of the present invention taken on line XIV—XIV of the FIG. 12.

The guide rail 3 is extended in the front and rear direction of the vehicle. As shown in FIG. 4, the guide rail 3 includes side walls 3a, 3b and a bottom wall 3c. The guide rail 3 is substantially formed in a box-shaped configuration having a preset width. A wall portion 3d disposed on the bottom wall 3c is projected in the upward direction so as to be parallel to the side walls 3a, 3b. The wall portion 3d is extended in the longitudinal direction of the guide rail 3 in order that the guide rail 3 is separated into a gutter portion 31 located outside of the vehicle cabin and a rail portion 32 located inside of the vehicle cabin.

Each of the side walls 3a and wall portions 3d includes guide grooves 32a, 32b, respectively, which are disposed inside of the rail portion 32 so as to be extended in the longitudinal direction of the rail portion 32. Further, the wall portion 3d includes a cable groove 32c connected with the guide groove 32b and disposed inside of the rail portion 32 so as to be extended in the longitudinal direction of the rail portion 32. On the other hand, a flange portion 3e is integrally formed on the side wall 3b and is disposed outside of the rail portion 32 so as to be extended in the longitudinal direction of the guide rail 3. The flange portion 3e projects outside of the vehicle cabin in order that the guide rail 3 is fixed on the roof panel 1. The guide rail 3 is made of an aluminum material preferably by an extrusion molding. As shown in FIG. 3, a groove portion 32d opening at the inside of the rail portion 32 is disposed on a wall located at an upper portion of the guide groove 32a so as to be linked with a check mechanism 9.

As shown also in the FIG. 1, a front shoe 4 is slidably disposed in the guide rail 32a and a rear shoe 7 is slidably disposed in the guide rails 32a, 32b. One end of the supporting link 51 of the link mechanism 5 is pivotably supported on the front shoe 4 by a pin 53. On the other hand, one end of the lift link 52 is pivotably supported on the rear shoe 7 by a pin 54. A guide pin 52a mounted on one side of the lift link 52 is slidably disposed in a cam groove 51a formed at a rear portion of the supporting link 51 so as to connect the supporting link 51 and the lift link 52. Further a cable 8 connected with a driving mechanism (not shown in the FIGURES) and fixed to the rear shoe 7 is slidably inserted in the cable groove 32c.

The check mechanism 9 is disposed between the front shoe 4 and the guide rail 3 as shown in the FIGS. 2 and 3. The check mechanism 9 includes a check member 91, a striker 92 and a latch member 93. The check member 91 is connected with the front shoe 4 through a intermediate plate 94 so as to be engaged and disengaged with the groove portion 32d of the guide rail 3. The intermediate plate 94 is elastic in the width direction of the guide rail 3 so as to be able to be transformed corresponding to the engagement of the check member 91 and the groove portion 32d. The intermediate plate 94 biasses the check member 91 in order that the check member 91 is engaged with the groove portion 32d. The check member 91 is formed on the intermediate plate 94 integrally.

The striker 92 is fixed to the cable 8 so as slide with the cable 8. The latch member 93 is pivotably and slidably disposed in the guide rail 32a. The latch member 93 is fixed to the check member 91 for rotation about the check member 91 parallel to the bottom wall 3c. The latch member 93 includes a contacting wall 93a disposed on a trace of the movement of the striker 92 and a fork groove 93b with which the striker 92 is engaged and which is formed into U-shaped configuration. A distance A (FIG.3) from a rotational center of the latch member 93 to a contacting point of the latch member 93 with the striker 92 is larger than the other distance B from a rotational center of the latch member 93 to a fixed point of the check member 91 with the latch member 93. An elastic plate 97 is preferably disposed between the latch member 93 and the intermediate plate 94. The elastic plate 97 always biasses the latch member 93 so as to engage the check member 91 with the groove portion 32d.

An operation of the sunroof device for a vehicle will be described hereinafter. The link mechanism, 5 is shown in FIG. 1 by real line when the movable panel 6 closes the opening 2. The check mechanism 9 is shown in FIG. 7 when the movable panel 6 opens the opening 2. The striker 92 is disengaged with the latch member 93 and the check member 91 is engaged with the groove portion 32d so as to prevent the front shoe 4 from being slid along the guide groove 32a.

When the driving mechanism is driven so as to slide the rear shoe 7 in the front direction of the vehicle along the guide grooves 32a, 32b through the cable 8, the lift link 52 is rotated about the pin 54 so as to be raised relative to the guide rail 3 by an operation of the cam groove 51a and the guide pin 52a. At this time, the check member 91 is kept engaged with the groove portion 32d since the front shoe 4 is prevented from sliding by an engagement of the check member 91 and the groove portion 32d. The striker 92 is slid away from contact with wall 93a of the latch member 93 with the rear shoe 7 so as not to be engaged with the latch member 93. Therefore, the supporting link 51 is tilted up about the pin 53 according to the rotational movement of the lift link 52. Consequently, the movable panel 6 opens the opening 2 shown in the FIG. 1 by the two-dotted line (Tilt up Position).

Figure 5:
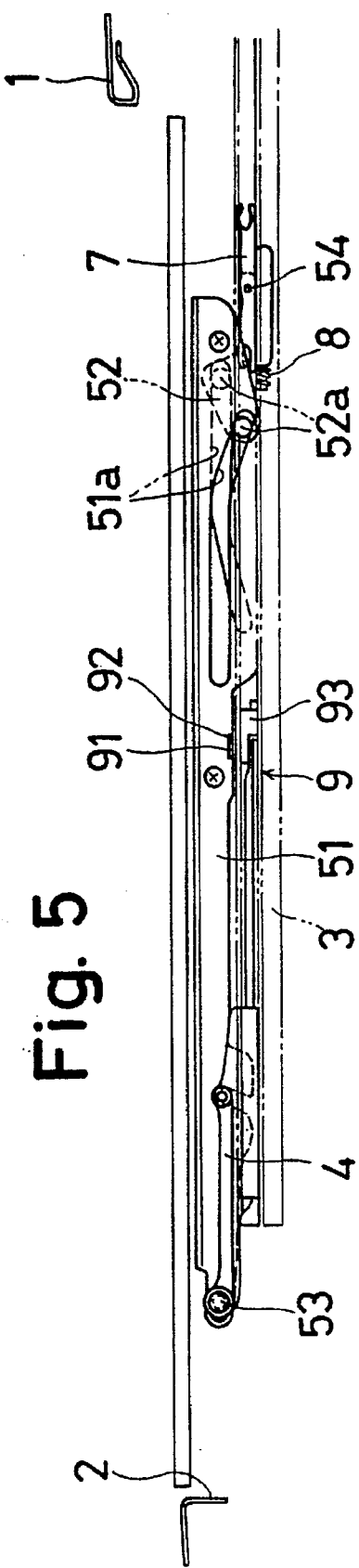
FIG. 5 is a side view of the sunroof device of the present invention for explaining the operation of the invention.

Under the condition shown in FIG. 1, when the driving mechanism is driven in the counter direction relative to operation described above so as to slide the rear shoe 7 in the rear direction of the vehicle along the guide grooves 32a, 32b through the cable 8, the lift link 52 is rotated about the pin 54 so as to be moved down relative to the guide rail 3 by the operation of the cam groove 51a and the guide pin 52a. At this time, the supporting link 51 is rotated in the clock-wise direction shown in the FIG. 1 about the pin 53 (Slide down Operation) in accordance with the operation of the lift link 52 since the front shoe 4 is prevented from sliding by engagement of the check member 91 and the groove portion 32d. Therefore, the movable panel 6 is tilted down to the lowest position shown in the FIG. 5 (Slide down Position).

At this time, the striker 92 is slid toward the contacting wall 93a of the latch member 93 with the rear shoe 7 so as to become engaged with the contacting wall 93a, as shown in the FIG. 8.

As the rear shoe 7 is further slid in the rear direction of the vehicle along the guide grooves 32a, 32b, the striker 92 is also further slid with the rear shoe 7 so as to be engaged with the contacting wall 93a shown in the FIG. 8. Therefore, the striker 92 applies force to the contacting wall 93a of the latch member 93 and becomes engaged with the fork groove 93b by causing the latch member 93 rotate in the clock-wise direction shown in the FIG. 9 against the elastic force of the elastic plate 97 (FIG. 3) and the intermediate plate 94. As shown in the FIG. 9, check member 91 is moved in an upward direction with the transformation of the intermediate plate 94. The check member 91 and the groove portion 32d are thus disengaged, and the front shoe 4 can be slid along the guide groove 32a. Because the distance A is larger than the distance B (FIG. 3), the latch member 93 can move the check member 91 in the upper direction by leverage. Therefore, the check member 91 can be moved by the small rotational force (biasing force applied to the contacting wall 93a) of the latch member 93.

When the rear shoe 7 is further slid in the rear direction of the vehicle along the guide grooves 32a, 32b, the front shoe 4 is slid with the check mechanism 9 in the rear direction of the vehicle along the guide groove 32a. At this time, the rotational operation of the latch member 93 in the counter clockwise direction shown in the FIG. 10 by the elastic force of the elastic plate 97 is delimited by the engagement of the check member 91 and an upper end of the guide groove 32a so as to keep engagement between the striker 92 and the latch member 93. Therefore, the lift link 52 is slid rearwardly while keeping the slide down position so that the movable panel 6 may open the opening 2.

When the rear shoe 7 is caused to slide in a direction opposite to that just described along the guide grooves 32a, 32b, the movable panel 6 closes the opening 2. At this moment, when the check member 91 is located near the groove portion 32d, the check member 91 is automatically engaged with the groove portion 32d by the elastic force of the intermediate plate 94 and the elastic plate 97 rotating the latch member 93. Further, the striker 92 and the latch member 93 are disengaged by the rotation of the latch member 93 according to the movement of the check member 91.

As described above, in accordance with the invention the check member 91 is engaged and disengaged with the groove portion 32d according to the slide movement of the rear shoe 7 since the striker 92 for engaging and disengaging with the latch member 93 is fixed to the cable 8. Therefore, although the movable panel 6 is dislocated from the tilt position to be located relative to the corresponding position of the rear shoe 7 because of the manufacturing variations of the scale of the parts in the link mechanism 5, the timing of the engagement and the disengagement of the check member 91 is not dislocated from the timing to be engaged and disengaged relative to the corresponding position of the rear shoe 7. Therefore, slide stroke of the rear shoe 7 is not varied relative to a predetermined stroke. Consequently, the sunroof device for a vehicle can be small in size and light in weight because of the miniaturization of the rear shoe 7.

Further, because the check member 91 and the groove portion 32d are engaged and disengaged by the rotational movement of the latch member 93 and the check member 91 is fixed on the latch member 93, the rotational direction of the latch member 93 is in accord with the engagement and disengagement direction of the check member 91. Therefore, the check member 91 can be efficiently engaged and disengaged with the groove portion 32d so that the sliding resistance of the rear shoe 7 may be reduced.

Furthermore, because the driving force sliding the movable panel 6 from the driving mechanism is transmitted to the front shoe 4 through the striker 92, the latch member 93 and the check member 91, the link mechanism 5 does not receive a large driving force. Therefore, moment and friction are not generated at the link mechanism 5.

Figure 17:
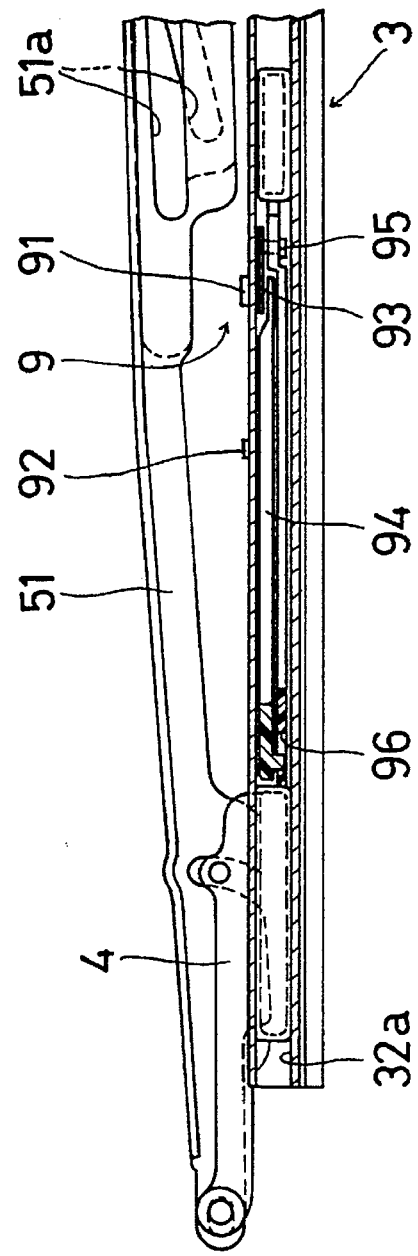
FIG. 17 is a side view of FIG. 16 of the sunroof device of the present invention.
Figure 16:
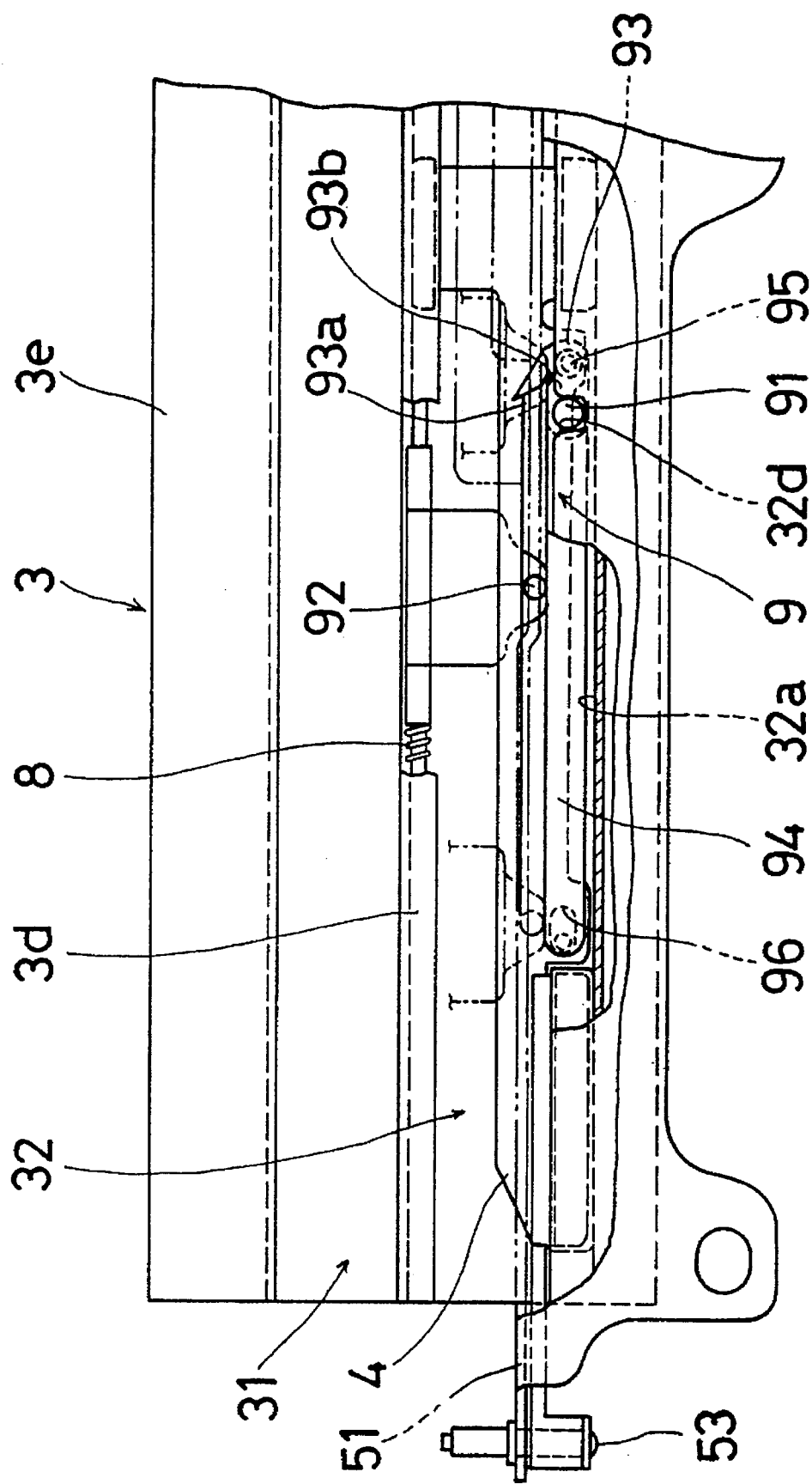
FIG. 16 is a plan view of a further alternate embodiment of the first alternate embodiment of the sunroof device of the present invention.

A first alternate embodiment of the invention will be described hereinafter. In this embodiment the check mechanism 9 is alternated whereby the latch member 93 is rotatably mounted on the front shoe 4 through a pin 95. As shown in FIGS. 11 to 14, the latch member 93 can be rotated vertically relative to the bottom wall 3c. The groove portion 32d for engaging and disengaging with the check member 91 is disposed on a projection wall 3f mounted on the rail portion 32. The striker 92 is disposed to cross the rail portion 32. Therefore considering the stiffness of the striker 92, the striker 92 is slidably supported in guide slots 96 provided on the intermediate plate 94 and the front shoe 4. The remaining structures and operations are similar to those of the foregoing embodiment. As shown in the further alternative embodiment of FIGS. 16 and 17, the latch member 93 may be disposed to be rotated parallel to the bottom wall 3c. In this case, the groove portion 32d is provided on the side wall 3a of the guide rail 3.

Figure 15:
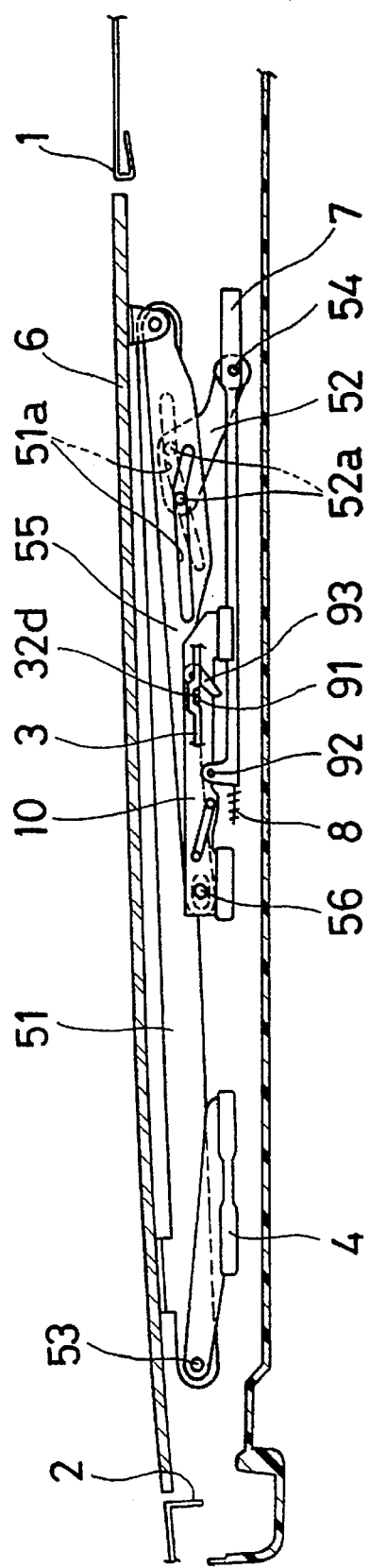
FIG. 15 is a side view of a second alternate embodiment of the sunroof device of the present invention.

A second alternate embodiment will be described hereinafter. In this embodiment the link mechanism 5 is alternated which includes a first lift link 52 and a second lift link 55. As shown in FIG. 15, the supporting link 51 is pivotably supported on the front shoe 4 through the pin 53 and the first lift link 52 is rotatably supported on the rear shoe 7 through the pin 54. The second lift link 55 is pivotably supported on a middle shoe 10 slidably supported on the guide groove 32a through a pin 56. The guide pin 52a is fit into the cam grooves 51a disposed on the supporting link 51 and the second lift link 55 so that the supporting link 51, the first lift link 52 and the second lift link 55 may be operationally connected to one another. The latch member 93 of the check mechanism 9 is pivotably supported on the middle shoe 10. The check member 91 is integrally formed on the latch member 93. The striker 92 is integrally formed on the rear shoe 7. The check member 91 is engaged and disengaged with the groove portion 32d by the rotational operation of the latch member 93 generated by the engagement and disengagement of the striker 92 with the latch member 93. Because the middle shoe 10 is delimited to be slid along the guide groove 32a by the engagement of the check member 91 and the groove portion 32d, the front shoe 4 is also prevented from being slid along the guide groove 32a.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A sunroof for a vehicle having a roof and an opening in said roof, comprising:

a guide rail to be mounted adjacent said opening and having a groove;

a movable panel for opening and closing the opening in said roof;

a link mechanism, said movable panel being connected to said link mechanism;

a driving shoe slidably disposed along the guide rail and connected to the link mechanism;

means for driving said driving shoe;

a driven shoe slidably disposed along the guide rail and connected to the movable panel;

a check mechanism for preventing and permitting movement of the driven shoe, including a movable striker connected to the driving shoe to move in response to movement of said driving means, a check member engagable with and disengagable from the groove in the guide rail connected to the driven shoe, an elastic member for biasing the check member so that the check member is removably retained in the groove in the guide rail, and disengagement means co-acting with and positioned adjacent said check member for contact by said striker for disengaging the check member from the groove in the guide rail;

said disengagement means being rotatable so that the disengagement means is rotated during engagement of the check member with and disengagement of the check member from the groove in the guide rail.

2. A sunroof for a vehicle having a roof panel and an opening in the roof panel comprising:

a guide rail to be fixed to said roof panel, said guide rail having a generally rectangular-shaped groove;

a movable panel slidable along the guide rail for opening and closing the opening of said roof panel, said movable panel sliding Under the roof panel when opening of the roof panel occurs;

a link mechanism connected to said movable panel;

a driving shoe slidably mounted in the guide rail and supporting the movable panel through said link mechanism;

means for driving said driving shoe;

a driven shoe slidably mounted in the guide rail and connected to the movable panel;

an intermediate member extending substantially in parallel with the guide rail and connected to the driven shoe such that the intermediate member moves together with the driven shoe;

a check member connected to the intermediate member and removably retained in said rectangular-shaped groove of the guide rail;

said intermediate member being elastic and serving as a bias for removably maintaining said check member in the rectangular-shaped groove of the guide rail;

a driven striker connected to move in response to movement of said driving means;

a rotatable lever positioned adjacent the rectangular-shaped groove of the guide rail and serving to contact and remove the check member from the rectangular-shaped groove of the guide rail when the striker is brought into contact with the lever, said check member being maintained in the rectangular-shaped groove of the guide rail until the driven striker is driven into contact with the lever.

3. A sunroof device as set forth in claim 2, wherein the lever includes a groove for receiving therein the driven striker.

4. A sunroof device as set forth in claim 3, wherein a first distance between a contact point of the lever with the driven striker and a rotational center of the lever is greater than a second distance between the center of the check member and the rotational center of the lever.

5. A sunroof device as set forth in claim 3, wherein the lever has a vertical axis about which it is rotatable.

6. A sunroof device as set forth in claim 3, wherein the lever has a horizontal axis about which it is rotatable.

7. A sunroof as claimed in claim 1 wherein said elastic member prevents disengagement of the check member from the groove in the guide rail prior to disengagement of the check member by the disengagement means.

8. A sunroof for a vehicle having a roof and an opening in said roof, comprising:

a guide rail to be mounted adjacent said opening and having a groove;

a movable panel for opening and closing the opening in said roof;

a link mechanism connected to said movable panel;

a driving shoe slidably disposed along the guide rail and connected to the link mechanism;

means for driving said driving shoe;

a driven shoe slidably disposed along the guide rail and connected to the movable panel; and a check mechanism for preventing and permitting movement of the driven shoe, the check mechanism including;

a latch member swingably connected to the driven shoe, a check member disposed on said latch member and connected to the driven shoe, said check member engageable with and disengageable from the groove in the guide rail, an elastic member for biasing the latch member so that the check member is removably retained in the groove in the guide rail, and a movable striker connected to the driving shoe, the movable striker contacting the latch member to cause the latch member to be swung against the biasing force of the elastic member to disengage the check member from the groove in the guide rail.

* * * * *